United States Patent
Warren

[15] 3,674,906
[45] July 4, 1972

[54] EDUCATION DEVICE EMPLOYING POLARIZED PLASTIC MATERIAL

[72] Inventor: Edward L. Warren, 6333 Stafford Drive, North Olmsted, Ohio 44070

[22] Filed: May 11, 1970

[21] Appl. No.: 36,094

[52] U.S. Cl. .................................................. 35/48 R, 35/9 H
[51] Int. Cl. .......................................................... G09b 3/00
[58] Field of Search ................. 35/25, 74, 3, 48, 9; 40/130 A; 350/111, 153, 159

[56] References Cited

UNITED STATES PATENTS

| | | | |
|---|---|---|---|
| 2,165,974 | 7/1939 | Land | 40/130 A X |
| 2,158,129 | 5/1939 | Land | 40/130 A X |
| 2,427,896 | 12/1947 | Bradley | 350/111 |

*Primary Examiner*—Robert W. Michell
*Assistant Examiner*—J. H. Wolff
*Attorney*—McNenny, Farrington, Pearne & Gordon

[57] ABSTRACT

A method and apparatus are disclosed for transmitting information from a first person to a second person while precluding transmission of the information to other persons. A first polarizing area and a second polarizing area are arranged such that their directions of polarization are angularly related. The first and second polarizing areas are displayed by the first person for visual perception by the second person, and light is passed through the first and second polarizing areas. A polarizing means is provided for blocking light received from one of the polarizing areas and for permitting light received from the other of the polarizing areas to pass therethrough so that the information is transmitted only to the second person when the second person views the first and second polarizing areas through the polarizing means. In a first and second embodiment, the first polarizing area is arranged in a first predetermined pattern corresponding to the information to be transmitted, and the second polarizing area cooperates with the first polarizing area to form a second predetermined pattern. In a third embodiment, the first polarizing area is positioned to cover the information that is to be transmitted and the second polarizing area is positioned to cover other information.

8 Claims, 4 Drawing Figures

PATENTED JUL 4 1972 3,674,906
SHEET 1 OF 2
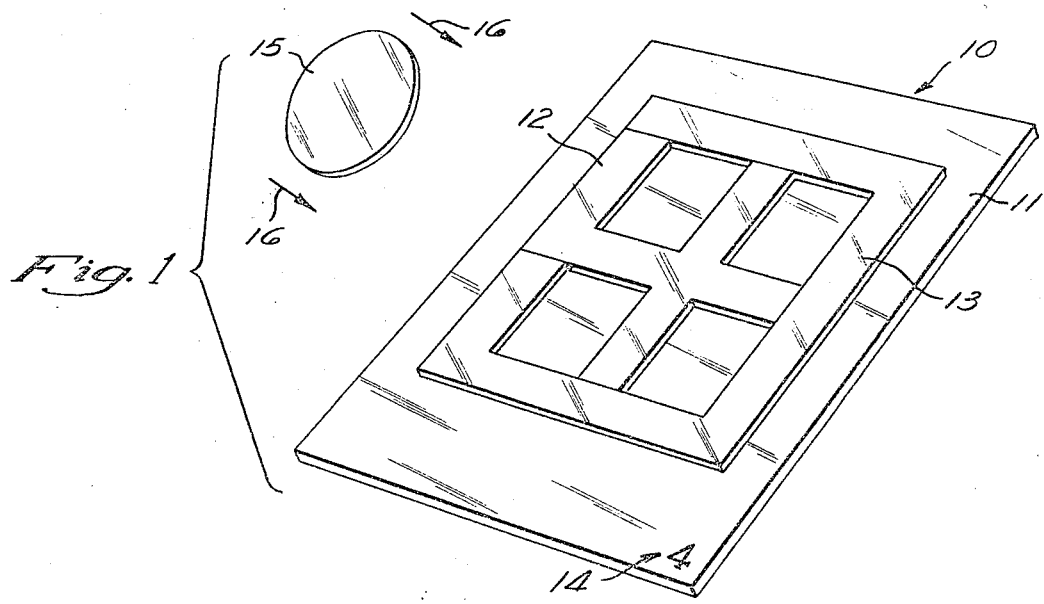
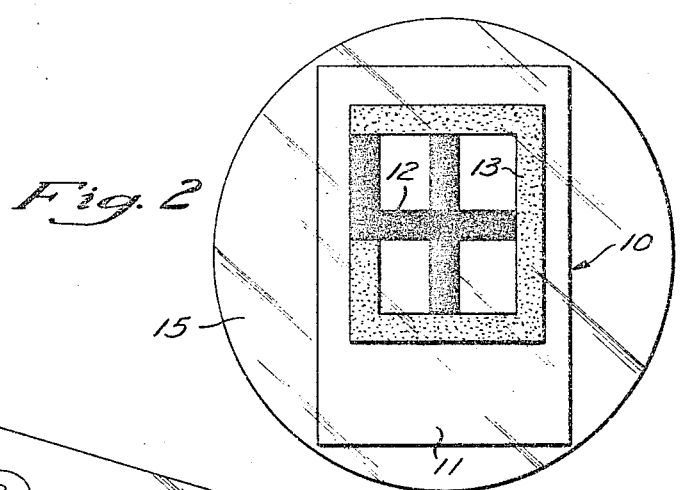
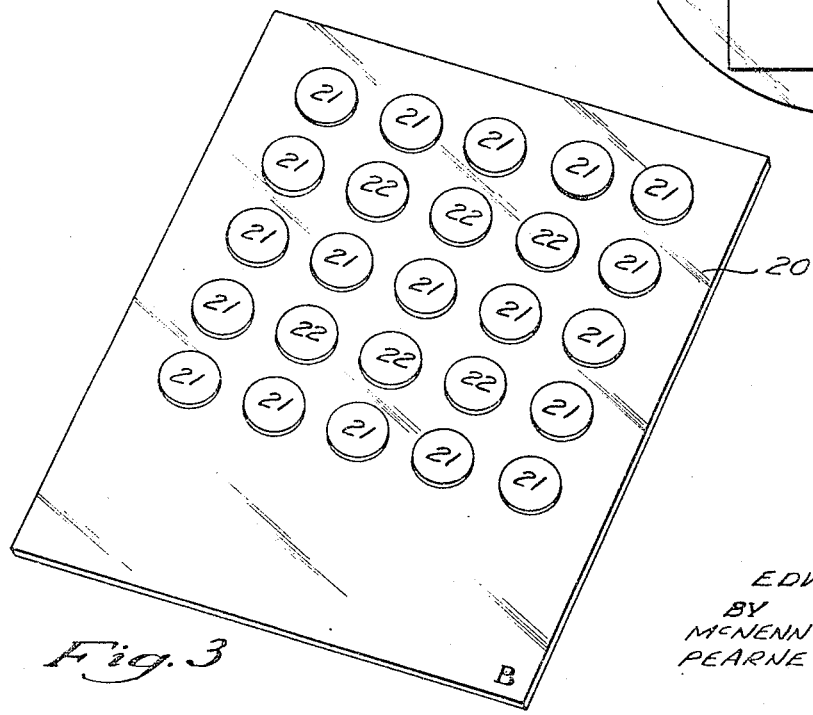
INVENTOR
EDWARD L. WARREN
BY
MCNENNY, FARRINGTON,
PEARNE & GORDON
ATTORNEYS INVENTOR
EDWARD L. WARREN
BY
McNENNY, FARRINGTON,
PEARNE & GORDON

ATTORNEYS

3,674,906

EDUCATION DEVICE EMPLOYING POLARIZED PLASTIC MATERIAL

BACKGROUND OF THE INVENTION

This invention relates generally to a method and apparatus for transmitting information between persons without transmitting the information to other persons. More particularly, the invention relates to a method and apparatus for transmitting an answer from a student to an instructor in response to a question, while precluding transmission of the answer from the student to other students.

It is often desirable to transmit information between persons without transmitting the information to other persons. For example, in a school classroom, an instructor may wish to pose questions to stimulate thinking by the students and/or to receive an independently reasoned answer from each of the students. Prior to the present invention, questions posed to a class of students by an instructor were generally answered by a single student. Because the other students of the class are precluded under this method from participating in the answering of every question, it is often difficult to maintain the interest and attention of these other students. Furthermore, the instructor is able to determine only if that single student is aware of the answer and cannot determine if the other students are aware of the answer to guide the instructor in asking further questions or giving further instruction.

SUMMARY OF THE INVENTION

The present invention overcomes these and other problems of prior art methods and apparatus for transmitting information by providing a method and apparatus for transmitting information between first and second persons without transmitting the information to other persons. The invention further provides such a method and apparatus which may be used in a school classroom for transmitting an answer from a student to an instructor in response to a question while precluding the transmission of the answer from the student to other students. Because each student must independently answer each question, each student is compelled to exercise the necessary thought process to consider each question and arrive at an answer to each question, albeit correct or incorrect. In this manner, the method and apparatus of the present invention maintain the interest and attention of all of the students, compel each student to consider each question, and give the instructor an indication of which students are aware of the answers to specific questions.

The preferred method of transmitting information from a first person to a second person according to the present invention includes the first person displaying a device for visual perception by the second person. The device includes a polarizing area normally allowing visual perception of the information to be transmitted in conjunction with other information. The second person views the device through a polarizing means so that the information to be transmitted is distinguished from the other information. In this manner, when the method is used in a school classroom, each of the students may display the device which contains the answer he has chosen to be transmitted to the instructor. However, the other students in the class cannot determine what the answer is by looking at the device, because it is perceived by these other students in conjunction with other information in such a manner that the answer that is to be transmitted to the instructor cannot be preceived. The teacher, however, views the device through a polarizing means so that the answer shown on the device is distinguished from the other information. In this manner, each student is compelled to consider each question and arrive at an answer to each question, and the instructor is able to determine which students have arrived at the correct answer.

Further according to the present invention, a device is provided for transmitting information which includes a first polarizing area and a second polarizing area. The directions of polarization of the first and second areas are angularly related so that the information is communicated only when the first and second polarizing areas are simultaneously viewed through a polarizing means. In this manner, when the device is used in a school classroom, a device containing an answer to a question may be displayed by each student. However, the answer contained on each device is not communicated to any of the other students, but is only communicated to the instructor when the instructor views the first and second polarizing areas of the device simultaneously through a polarizing means.

According to a first embodiment, the first polarizing area of the device is arranged in a first predetermined pattern corresponding to the information to be transmitted, and the second polarizing area cooperates with the first polarizing area to form a second predetermined pattern. The first predetermined pattern can then be perceived only when the device is viewed through a polarizing means, because the second polarizing area disguises the first predetermined pattern when the device is viewed without the aid of a polarizing means. In the preferred embodiment, the second predetermed pattern includes four rectangles, and each of the rectangles includes two sides shared in common with two other rectangles. This arrangement permits the use of plurality of cards all having the same above mentioned second predetermined pattern so that they all appear the same when they are not viewed through a polarizing means. However, the use of this second predetermined pattern permits the first predetermined pattern to be any Arabic numeral.

According to a second embodiment, a device is provided in which the first polarizing area is positioned to cover the information that is to be transmitted and the second polarizing area is positioned to cover other information. In this manner, when the device is viewed without the aid of a polarizing means, the information to be transmitted cannot be distinguished from the other information. However, when the device is viewed through a polarizing means, the information to be transmitted is distinguished from the other information. The second embodiment further provides such a device in which the first polarizing area is rotatably disposed relative to the information to be transmitted, and the second polarizing area is rotatably disposed relative to the other information. In this manner, the direction of polarization of the first and second polarizing areas may be selectively changed relative to the information to be transmitted and to the other information, respectively. Additionally, a means is provided to selectively change the content of the information to be transmitted and to selectively change the content of the other information.

BRIEF DESCRIPTION OF THE DRAWINGS

These and other aspects and advantages of the present invention will become more readily apparent upon a comprehensive understanding of the preferred embodiments of the invention shown in the drawings, wherein;

FIG. 1 is a perspective view of the preferred embodiment of the invention;

FIG. 2 is a top plan view of the device shown in FIG. 1 when it is viewed through a polarizing means;

FIG. 3 is a perspective view of a second embodiment of the invention; and

DESCRIPTION OF THE PREFERRED EMBODIMENTS

Figure 4:
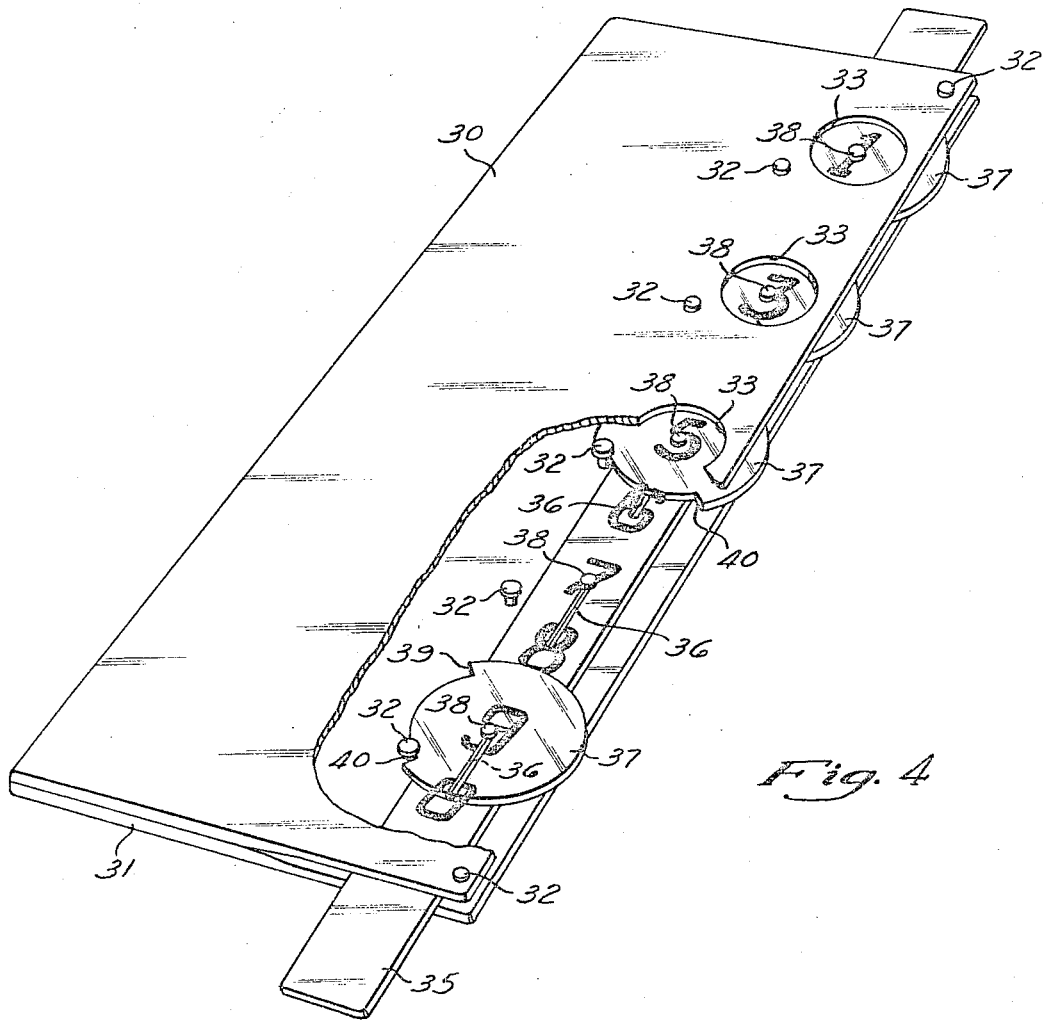
FIG. 4 is a perspective view, with portions cut away for clarity, of a third embodiment of the invention.

Referring now to the drawings in greater detail, FIG. 1 shows a device 10 for transmitting information from a first person to a second person without transmitting the information to other persons. The information transmitting device 10 includes a carrier member 11 which is of a thin but rigid cardboard in the preferred embodiment and is white to provide maximum light reflection. However, any other suitable material, including transparent or translucent materials, could also be used. The carrier member 11 is of a size that is conveniently held in one's hand, yet is large enough that information contained thereon may be perceived by a second person a substantial distance away from the device.

Adhesively mounted on the carrier member 11 are a first polarizing area 12 and a second polarizing area 13. The polarizing areas 12 and 13 are each of a transparent polarizing plastic material in the preferred embodiment to permit light reflected from the carrier member 11 to pass therethrough. The direction of polarization of the first polarizing area 12 is angularly related, preferably at an angle of about 90 degrees, to the direction of polarization of the second polarizing area 13 so that the information that is to transmitted by the device 10 is transmitted only when the first and second polarizing areas are simultaneously viewed through a polarizing means. The first polarizing area 12 is arranged in a first predetermined pattern corresponding to the information that is to be transmitted. In the embodiment shown in FIG. 1, this first predetermined pattern corresponds to the Arabic numeral four. The second polarizing area 13 may be considered as other information whether or not it is meaningful by itself, and cooperates with the first polarizing area 12 to form a second predetermined pattern which disguises the first predetermined pattern so that only the second predetermined pattern is transmitted to anyone viewing the device without the aid of a polarizing means in a manner described in detail hereinafter. Although the first polarizing means 12 and the second polarizing means 13 are each of a single piece construction in the embodiment shown in FIG. 1, each of them may, if desired, be of several pieces to further disguise the first predetermined pattern. As seen in FIG. 1, the second predetermined pattern includes four rectangles, each of which includes two sides shared in common with two other of the rectangles. In this manner, the same second predetermined pattern may be used on a plurality of such devices to disguise first predetermined patterns corresponding to any Arabic numeral. The person desiring to transmit the information may then be provided with ten such devices, each of which has a first predetermined pattern corresponding to an Arabic numeral different from that of all of the other devices, and each of which has a second predetermined pattern identical to that of all of the other devices.

Although the device shown in FIG. 1 can be utilized to transmit information under any desired circumstances, it is particularly adapted for use in a school classroom where it is desired to transmit an answer from a student to an instructor in response to a question asked by the instructor without transmitting the answer to the other students. When the device is so used in a school classroom, each student is provided with a plurality of devices, such as shown in FIG. 1, but with each of the devices arranged such that its first predetermined pattern corresponds to a different piece of information to be transmitted and its second predetermined pattern is identical to the second predetermined pattern of each of the other devices.

In the preferred method of the present invention, each student is provided with ten devices, each of which includes a first polarizing area arranged in a first predetermined pattern corresponding to an Arabic numeral. The instructor poses a question for consideration by each of the students, which may relate to a mathematics problem to which the answer would be a number or to a multiple choice type question to which the answer would be a number indicating the chosen answer. Each student, after considering the question, selects the particular device in which the first predetermined pattern corresponds to the answer that he has selected. Small indicating means, such as the numeral four printed in the lower right hand corner of the device 10 and indicated at 14, are provided on each device to indicate to the student the information of the first predetermined pattern on the device. The indicating means 14 is arranged such that it is covered, such as by the student's hand, when the device is used. The device which the student selects is then held by the student for visual perception by the instructor. Since the other students of the class will only be able to see the second predetermined pattern on the device, the first predetermined pattern corresponding to the answer that is being transmitted to the instructor is not transmitted to them. The instructor, however, views the device through a polarizing means, such as transparent polarizing means 15, in the direction indicated by arrows 16. The polarizing means 15, which may be polarizing eyeglasses, is arranged such that its direction of polarization is substantially parallel to that of the second polarizing area 13 and is angularly related to that of the first polarizing area 12, preferably at an angle of about 90°. In this manner, light reflected from the carrier member 11 through the first polarizing area 12 is polarized in such a direction that it is substantially blocked by the polarizing means 15, so that the portion of the carrier member 11 which is covered by the first polarizing area 12 appears darker to the instructor than the portion of the carrier member 11 which is covered by the second polarizing area 13. The information contained in the first predetermined pattern of the device displayed by each student is thus transmitted to the instructor without being transmitted to any of the other students. FIG. 2 illustrates this operation of the device 10 by showing how the device 10 appears to a person viewing the polarizing areas 12 and 13 simultaneously through the polarizing means 15 to permit the information of the first predetermined pattern to be transmitted to the viewer. Since each student must independently answer each question, each student is compelled to consider each question, and the instructor is given an indication of which students are aware of the answers to specific questions.

A second embodiment of the invention is shown in FIG. 3. This embodiment includes a carrier member 20, which is of a thin but rigid cardboard in the preferred embodiment, and is white to provide maximum light reflection. Alternatively, the carrier member 20 may be of a translucent or transparent plastic material, or any other suitable material. Adhesively mounted on the carrier member 20 is a first polarizing area, which includes a plurality of individual transparent plastic polarizing elements 21 arranged in a first predetermined pattern corresponding to the information that is to be transmitted by the device. In this embodiment, the information to be transmitted is the letter "B." Also adhesively mounted on the carrier member 20 is a second polarizing area, which includes a plurality of transparent plastic polarizing elements 22. The second polarizing area cooperates with the first polarizing area to form a second predetermined pattern, which is a square in the embodiment shown in FIG. 3. In this manner, the second polarizing area disguises the first polarizing area so that the information corresponding to the first predetermined pattern cannot be perceived unless the device is viewed through a polarizing means. The direction of polarization of each element 21 is the same and is angularly related to the direction of polarization of each element 22, preferable at an angle of about 90°. This information of the first predetermined pattern may be perceived by a viewer only when the device shown in FIG. 3 is viewed through a polarizing means, which is preferably arranged such that its direction of polarization is parallel to that of the elements 22 and angularly related to that of the elements 21. When the device is viewed through such a polarizing means, light reflected from the carrier member 20 through the elements 21 is polarized in such a direction that it is substantially blocked by the polarizing means, so that the portion of the carrier member 20 which is covered by the elements 21 appears darker to the person to whom the information is to be transmitted. In this manner, the information of the first predetermined pattern of the elements 21 is transmitted only to the person viewing the device through the polarizing means and is not transmitted to other persons. The device shown in FIG. 3 may be used in the same manner as the device shown in FIG. 1, which has been explained in detail above.

A third embodiment of the invention is shown in FIG. 4. This device includes a top member 30 and a bottom member 31, which are fastened together such as by suitable rivets 32. The top and bottom members 30 and 31 are each of a thin, rigid, and durable cardboard in the embodiment shown in FIG. 4, but may alternatively be of plastic or any other suitable material. The top member 30, however, should be opaque for reasons that will become apparent hereinafter. The top member 31 includes five viewing openings 33.

Slidably carried by the bottom member 31, and sandwiched between the top member 30 and the bottom member 31, is an elongated slider member 35. The slider member 35 is of a rigid and durable cardboard material, which is preferably white to provide maximum light reflection. The member 35 is provided with five axially extending slots 36, two of which may be seen in FIG. 4. Five plastic polarizing elements 37, four of which may be seen in FIG. 4 and one of which has been removed for clarity, are rotatably disposed on the bottom member 31. Suitable rivets 38 extend from the elements 37 through the slots 36 and to the lower member 31. In this manner, each rivet 38 secures its associated plastic polarizing element 37 to the lower member 31 while providing a rotational axis therefor, and, additionally, cooperates with its associated slot 36 to define the range of movement of the slider member 35 with respect to the elements 37 and the lower member 31.

As seen in FIG. 4, the Arabic numerals are all printed on the slider member 35 in numerical order, and each plastic element 37 is arranged such that it covers at least one of the numerals. Each element 37 is provided with a suitable cut-out portion to define an upper stop 39 and a lower stop 40. The rivets 32 are positioned such that they engage the lower stop 40 when the plastic elements are rotated clockwise and the upper stop 39 when the plastic elements 37 are rotated counterclockwise as viewed in FIG. 4 to define the allowable rotational movement of each of the polarized plastic elements 37 to be about 90°. This permits the directions of polarization of each of the plastic elements 37 to be rotated 90° independently of all of the other elements 37. For convenience in the operation of the device shown in FIG. 4, the elements 37 are arranged such that the direction of polarization of each element 37 is parallel to the direction of polarization of each of the other elements 37 when each element is rotated so that its lower stop 40 engages its associated rivet 32, and also when each of the elements 37 is rotated counterclockwise so that its upper stop 39 engages its associated rivet 32.

When the sliding member 35 is pulled downwardly to the position shown in FIG. 4 by the operator of the device, the odd Arabic numerals printed on the slider member 35 appear in the openings 33. When the slider member 35 is pulled from this position shown in FIG. 4 upwardly, the even Arabic numerals and the Arabic numeral zero appear in the openings 33 in the top member 30. In this manner, movement of the slider member 35 changes the information which appears in each opening 33 so that the simple and relatively small device shown in FIG. 4 may be utilized to transmit any one of the ten Arabic numerals.

Although the device shown in FIG. 4 may be used to transmit information from a first person to a second person without transmitting the information to other persons in any desired situation, it is particularly well-suited for use in a school classroom. When so used, each student is provided with a device as shown in FIG. 4, and a question is posed to the class by the instructor. The question may relate to a mathematics problem to which the answer would be a number or a multiple choice type question to which the answer would be a number indicating the chosen answer. After the student has considered the problem and arrived at an answer which he wishes to transmit to the instructor, the student positions the slider member so that the answer appears in one of the openings 33. The plastic polarizing element 37 which covers this particular number may be called a first polarizing area, and is rotated so that its direction of polarization is angularly related to the direction of polarization of each of the other plastic polarizing elements 37 which collectively may be called a second polarizing area. The student then displays the device to the instructor, and the instructor views the first and second polarizing areas simultaneously through a polarizing means, which may be eyeglasses with polarizing lenses. The direction of polarization of the polarizing means is parallel to the direction of polarization of the first polarizing area and is angularly related to the direction of polarization of the second polarizing area, preferably at an angle of about 90°, so that only light reflected from the portion of the slider member 35 and hence only the chosen number which is covered by the first polarizing area can be perceived by the instructor. In this manner, the answer is transmitted from the student to the instructor without being transmitted to any of the other students.

Although a preferred embodiment and two alternate embodiments of the invention have been shown and described in detail, various modifications and rearrangements of parts may be resorted to without departing from the scope of the invention as defined by the claims.

I claim:

1. A method of transmitting information from a first person to a second person without transmitting the information to other persons comprising said first person displaying a device including said information to be transmitted for visual perception by said second person and said other persons, said device including a first polarizing area arranged in a first predetermined pattern corresponding to said information and a second polarizing area cooperating with said first polarizing area to form a second predetermined pattern, the directions of polarization of said first and second areas being angularly dissimilar, said second predetermined pattern including four rectangles, each of said rectangles including two adjacent sides each of which is shared with one other of said rectangles, causing light to pass through said first and second polarizing areas of said device, said other persons visually receiving said light and perceiving other information indistiguishably including said information to be transmitted, and said second person visually receiving said light through a polarizing means and perceiving said information to be transmitted by operation of said polarizing means.

2. A method as defined by claim 1 wherein said first polarizing area polarizes a first portion of said light in a first direction and said second polarizing area polarizes a second portion of said light in a second direction angularly related to said first direction, and said polarizing means precludes receipt of one of said portions of said light by said second person.

3. A method as defined by claim 2 including said first person selecting said device from a plurality of similar devices having differentiable characteristics.

4. A method of transmitting information from a first person to a second person without transmitting the information to other persons comprising said first person displaying a device including said information to be transmitted for visual perception by said second person and said other person, causing light to pass through first and second polarizing areas of said device, said other persons visually receiving said light and perceiving other information indistinguishably including said information to be transmitted, and said second person visually receiving said light through a polarizing means and perceiving said information to be transmitted by operation of said polarizing means, said first polarizing area polarizing a first portion of said light in a first direction and said second polarizing area polarizing a second portion of said light in a second direction angularly related to said first direction, and said polarizing means precluding receipt of one of said portions of said light by said second person, said first person changing the directions of polarization of said first and second polarizing areas relative to the direction of polarization of said polarizing means in response to a question asked by said second person.

5. In combination, a device for transmitting information including a first polarizing area arranged in a first predetermined pattern corresponding to said information and a second polarizing area cooperating with said first polarizing area to form a second predetermined pattern, the directions of polarization of said first and second areas being angularly dissimilar, said second predetermined pattern including four rectangles, each of said rectangles including two adjacent sides each of which is shared with one other of said rectangles; and a polarizing means for blocking light received from said second polarizing area and for permitting light received from the first polarizing area to pass therethrough so that said information is transmitted only when said first and second polarizing areas are simultaneously viewed through said polarizing means.

6. A device as defined by claim 5 wherein the angular relationship between said directions of polarization of said first and second predetermined patterns is about 90°.

7. A device as defined by claim 5 wherein said first predetermined pattern includes a numeral.

8. A device as defined by claim 5 wherein said first and second polarizing areas are secured to a carrier member and said carrier member includes a light reflecting means so that light is reflected from said carrier member through said first and second polarizing areas.

* * * * *